Feb. 13, 1923. 1,444,875.
B. HALL ET AL.
ADJUSTABLE COUNTERBORE.
FILED FEB. 15, 1917.
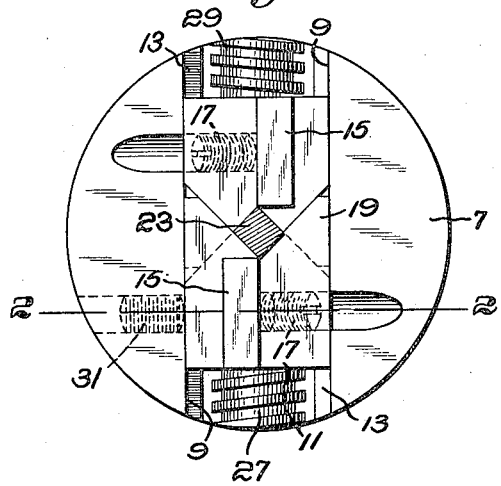
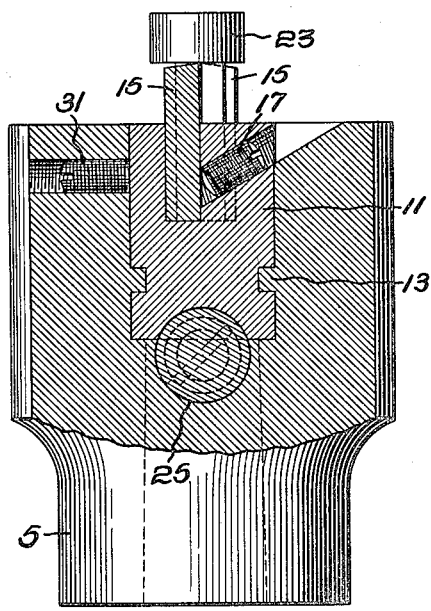
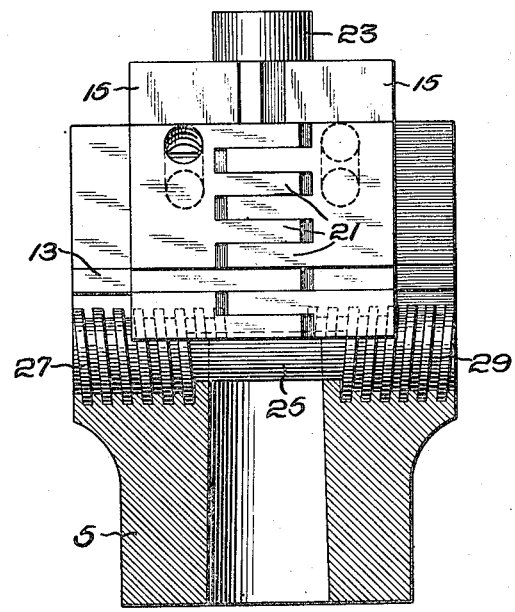
Inventors:
Bicknell Hall,
Aldibert C. Deering.
by Emery, Booth, Janney & Varney
Attys.

Patented Feb. 13, 1923.

1,444,875

UNITED STATES PATENT OFFICE.

BICKNELL HALL, OF TAUNTON, AND ALDIBERT C. DEERING, OF ABINGTON, MASSACHUSETTS, ASSIGNORS, BY DIRECT AND MESNE ASSIGNMENTS, TO HERBERT S. JAMES, OF BROCKTON, MASSACHUSETTS.

ADJUSTABLE COUNTERBORE.

Application filed February 15, 1917. Serial No. 148,868.

*To all whom it may concern:*

Be it known that we, BICKNELL HALL and ALDIBERT C. DEERING, citizens of the United States, and residents, respectively, of Taunton, county of Bristol, and Abington, county of Plymouth, and Commonwealth of Massachusetts, have invented an Improvement in Adjustable Counterbores, of which the following description, in connection with the accompanying drawings, is a specification, lke characters on the drawings representing like parts.

This invention relates to boring and facing tools, and the purpose is to provide a device of this kind capable of a wide range of work.

Our invention will best be understood by reference to the following description taken in connection with the accompanying drawings, wherein,—

Fig. 1 is a plan of a tool illustrating our invention, a part being broken away in ordei not to obscure the construction beneath;

Fig. 2 is a section on line 2—2 of Fig. 1; and

Fig. 3 is a side elevation of the tool as seen from the right of Fig. 2 broken away to show the interior construction.

Referring to the drawings, the tool here shown embodies a suitable stock 5, adapted to be given rotary motion in any suitable manner so that cutters carried thereby may bore a hole or face a surface. The cutters, in the present embodiment of the invention, are adapted to present their cutting edges at the end or end face 7 of the stock. We have herein shown this face as provided with a diametrical groove 9 and, seated in the groove 9, suitable cutter carriers 11 arranged for sliding movement therein. Referring to Fig. 2, it will be seen that the members 11 have a tongue and groove connection 13 with the walls of the groove 9, and they are thus held in position and guided for movement transversely of the stock. In the illustrated embodiment of the invention the cutters proper which are carried by the members 11 are independent parts separable therefrom although within the scope of our invention the carrying part and the cutting part carried thereby might be portions of an integral structure. The outer faces of the carriers 11 conveniently are flush with end face 7 and may be grooved to receive the cutters 15 which may be secured in place by the set screws 17. Conveniently, the face of the stock may be recessed, as shown, providing declivities by which access may be had to the set screws 17 without removing the carriers. These cutters project from the end 7 of the stock and are adapted to cut a circle of greater or less diameter according to their adjustment transversely thereof. It will be noted that, since the cutting edges are presented at the end of the tool, the size of the stock 5 does not impose a minimum on the size of the work.

Herein the opposed ends of the members 11 (see Fig. 1) are cut away in V-shaped notches 19, so that they present opposed jaws toward each other. The portions of the members at the sides of the notches are formed into tongues 21 best shown in Fig. 3 which are adapted to interlock or mortise together. Telescoping movement of the two members is thus permitted and the notch portions 19 form an effective pair of gripping jaws adjustable to different sizes by movement of the carrier members 11. A suitable pilot 23 (broken away in Fig. 1 in order not to obscure the construction of the jaws) may be clamped between the jaws 19 of the members 11. It will be seen that the pilot is interchangeable and one of suitable size for the hole which it is desired to counterbore with the tool may be selected and clamped into position.

Any suitable means may be provided for moving the members 11. We have here shown (see Figs. 2 and 3), a member 25 journaled in the stock at the base of the groove and having terminal right and left-hand threaded portions 27 and 29 respectively. The bases of the members 11 have threaded portions cooperating with the portions 27 and 29 as clearly seen in Fig. 2. It is apparent that by turning the member 25, equal and opposite movements toward and from the center of the stock will be given to the two carriers 11, thereby permitting jaws 19 to clamp or unclamp the pilot 23 and adjusting the cutters 15. A set screw 31 may be provided (Figs. 1 and 2) to engage one of the carriers 11 and thus serve to clamp the two in their adjusted position.

From the description given of the embodiment of our invention shown and described herein for purposes of illustration, it will be apparent that we have provided a tool applicable for use in counterboring holes or facing surfaces of a wide range of sizes. The particular details of the mechanical construction which we have here illustrated we have referred to by way of example. The invention is not, of course, limited to the exact structure disclosed except as required by the scope of the appended claims, but what we claim and desire to secure by Letters Patent is:

1. A tool of the class described, comprising a stock, a cutter carrier mounted at the end of the stock for adjustment transversely, said carrier having a portion serving as a jaw adapted to receive a substantially axial pilot member, there being a cooperating jaw relatively to which said jaw portion may be moved by adjustment of said carrier, and means for removably mounting a cutter in said carrier.

2. A tool of the class described comprising a stock, members mounted at the end of the stock for adjustment transversely thereof, said members having opposed jaw portions to receive and support a substantially axial pilot member and removable cutters carried by said members.

3. A tool of the class described comprising a stock, members mounted at the end of the stock having opposed jaw portions to receive and support a substantially axial pilot member, removable cutters carried by said members and means for simultaneously effecting equal and opposite movements of said members.

4. A tool of the class described, comprising a stock having a groove across an end face thereof, members seated in said groove substantially flush with such face, means for mounting cutters in said members to project at said end face of the stock, and means to move said members to and from each other in said groove.

5. A tool of the class described, comprising a stock having a groove across an end face thereof, members seated in said groove substantially flush with such face and having opposed jaw portions, means for mounting cutters in said members to project at said end face of the stock, and means to move said members to and from each other in said groove.

6. A tool of the class described comprising a stock having a groove across an end face thereof, cutter carriers seated in said groove substantially flush with the face and means to move said carriers toward and from each other in the groove, said carriers having cutter-receiving grooves and set screw-receiving openings extending laterally therefrom, the face of the stock having recesses providing for access to the set screws without removal of the carriers.

7. A tool of the class described comprising a stock having a groove across an end face thereof, cutter carriers seated in said groove having opposed faces providing holding jaws, and means for adjusting the carriers toward and from one another, said carriers having provision for receiving cutters permitting radial adjustment of the cutters to fix their position independently of the adjusted position of the carriers.

8. A tool of the class described comprising a stock, members mounted in the end of the stock for adjustment transversely thereof, said members having opposed jaw portions adapted to be closed on an axial pilot member and also having open ended grooves and cutters removably mounted in said grooves for adjustment therein radially of the end face of the stock.

In testimony whereof, we have signed our names to this specification.

BICKNELL HALL.
ALDIBERT C. DEERING.